No Printed Specification Available
6634X
Payne & Rundell,
Cotton Press,
Patented July 20, 1831.
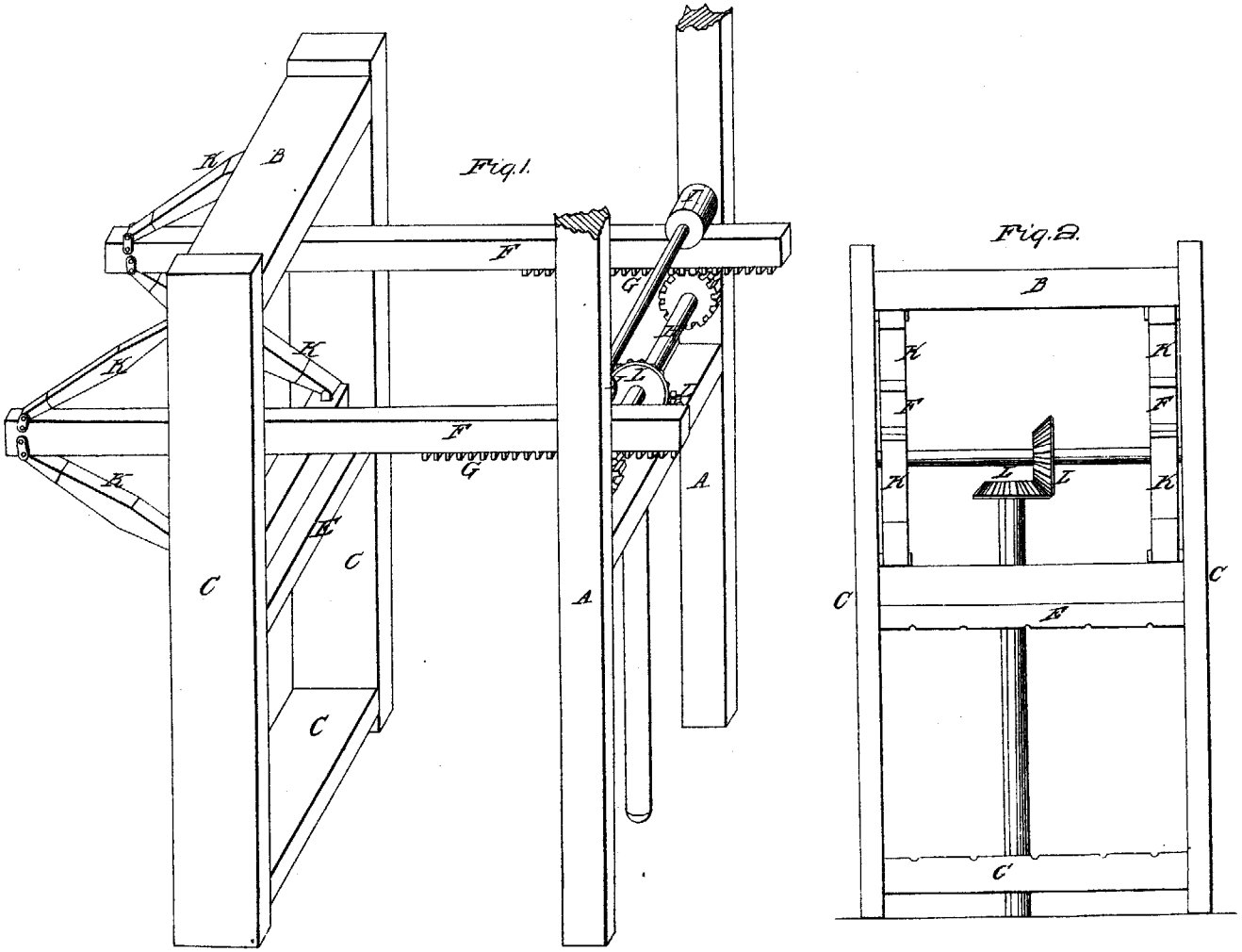
AM. PHOTO-LITHO. CO. N.Y. (OSBORNE'S PROCESS)

July 20. 1831

6634X Philenzo Payne and Joshua Rundell of Claiborne Mississippi

Letters Patent.

The Schedule referred to in these Letters Patent and making part of the same containing a description in the
words of the said Philenzo Payne and Joshua Rundell themselves of their improvement in the Press
for Pressing Cotton and other soft fibrous substances

Be it known That We Philenzo Payne and Joshua Rundell of Port Gibson Claiborne County
State of Mississippi have made an improvement in the press for pressing cotton and other soft
fibrous substances which is described as follows. The Press consists of the following parts (viz).
1. The Frame. 2 The Follower and posts. 3. The Carriage or ways. 4 The Toggle jointed Levers. 5
The horizontal shafts and gearing. — 1. The Frame consists of two posts about twenty feet high
framed into a sill and cap piece of sufficient strength to sustain the required pressure: Also two
side pieces about twenty feet long and ten by sixteen inches thick, which may be either framed into
a separate end piece or into the frame of a house to support the carriage or ways and gearing to be
hereafter described. 2. The follower and Posts. The Posts or Stirrups are framed into a head piece
by making the heads of the posts lap over the head piece inward. The lower ends have projections outward
on which the ends of the levers hereafter described work. From the head piece is suspended the follower
hung on hinges. and which is made sufficiently long to press down the cotton or other substance without
opening the Box. Grooves are left on the lower side to allow the cords to pass.
3. The Ways or carriage are about twenty five feet long of sufficient size and strength to receive and
support the levers to be hereafter described. On the lower side and about seven feet along the outward end
are cogged racks for receiving the cogs placed on a horizontal shaft. These ways are supported on the horizontal
shaft, and have friction rollers placed over them to keep them in place. 4. The Toggle jointed Levers.
These are made by preparing four pieces of good ash. oak or any suitable timber about eight or ten feet
long and eight inches square made a little smaller at each end to receive the irons to be described;
At each end of each lever is inserted a piece of cast or wrought iron. about 14 inches long 2 inches thick
6 inches wide and having at the lower end a circular head on which it turns. The iron is let into the
lever by a T head. which keeps it fast when working up and down. On each side of the circular head
are gudgeons to work in Brass placed in the head & foot and on each side of the ways. These pieces of iron with
circular heads and gudgeons are fastened to the ways by straps or bolts of iron. 5 The Horizontal Shaft
and Gearing. A horizontal shaft is made of a length equal to the width of the frame, and turning on
gudgeons and boxes. On each end is ^placed^ a cog wheel working in the racks on the under side of the ways. and a
beveled cog wheel in the centre working into a cog wheel on the driving shaft. Operation. The Cotton or 6634X July 20, 1831 substance to be pressed being placed in the box in the usual way. The main shaft is turned by animal or other power; the cog wheel on the upright shaft turns the bevel wheel on the horizontal shaft which causes the cog wheels on its ends to work in the racks of the ways and draw them in; these now bring forward and straighten on the toggle jointed levers which press down the follower with the cotton in the box. The cords are then inserted thro the openings on the lower side of the follower and the bale tied. When this press is used for repacking cotton, the posts or stirrups may be dispensed with, and the toggle jointed levers applied immediately to the follower. The Box may also be dispensed with. What we claim as our invention and for which we solicit a Patent is the before described machine for pressing cotton or other soft fibrous substances. Further to illustrate our invention we refer to the model and drawing of the same deposited in the Patent Office.

Coyd
WGC.

Witnesses
[illegible]. M. Hooper
John Robertson

Philenzo Payne
Joshua Rundell